(No Model.) 2 Sheets—Sheet 1.
E. K. KINKER.
Dress Chart.
No. 242,542. Patented June 7, 1881.
*Fig. 1,*
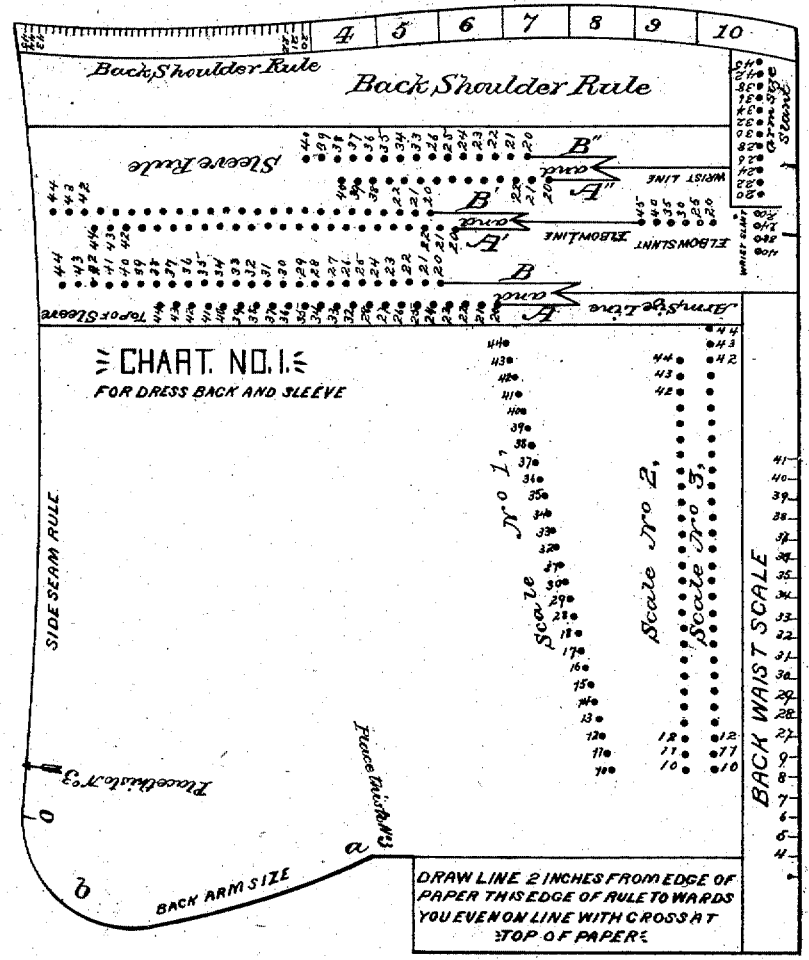
*Fig. 3,*
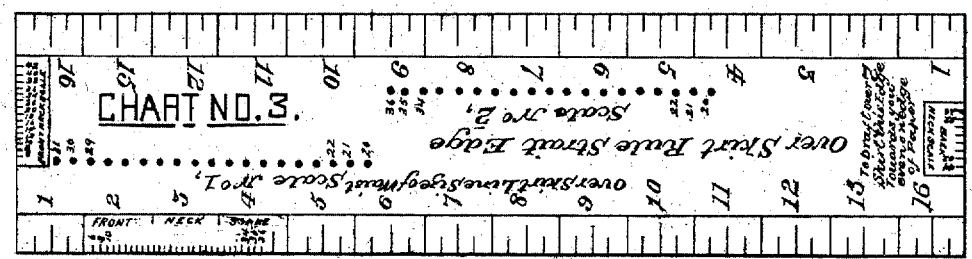
WITNESSES
Fred. G. Dieterich
Chas. H. Peters
INVENTOR
Ellen K. Kinker
By her Attorneys, Louis Bagger & Co.

(No Model.)  E. K. KINKER.  2 Sheets—Sheet 2.
Dress Chart.

No. 242,542.  Patented June 7, 1881.

WITNESSES
Fred. G. Dieterich.
Chas. H. Baker.

By her Attorneys
Louis Bagger & Co.

INVENTOR
Ellen K. Kinker

UNITED STATES PATENT OFFICE.

ELLEN K. KINKER, OF CORVALLIS, OREGON.

DRESS-CHART.

SPECIFICATION forming part of Letters Patent No. 242,542, dated June 7, 1881.

Application filed April 4, 1881. (No model.)

*To all whom it may concern:*

Be it known that I, ELLEN K. KINKER, of Corvallis, in the county of Benton and State of Oregon, have invented certain new and useful Improvements in Dress-Charts; and I do hereby declare that the following is a full, clear, and exact description of the invention, which will enable others skilled in the art to which it appertains to make and use the same, reference being had to the accompanying drawings, which form a part of this specification, and in which—

Figure 2:
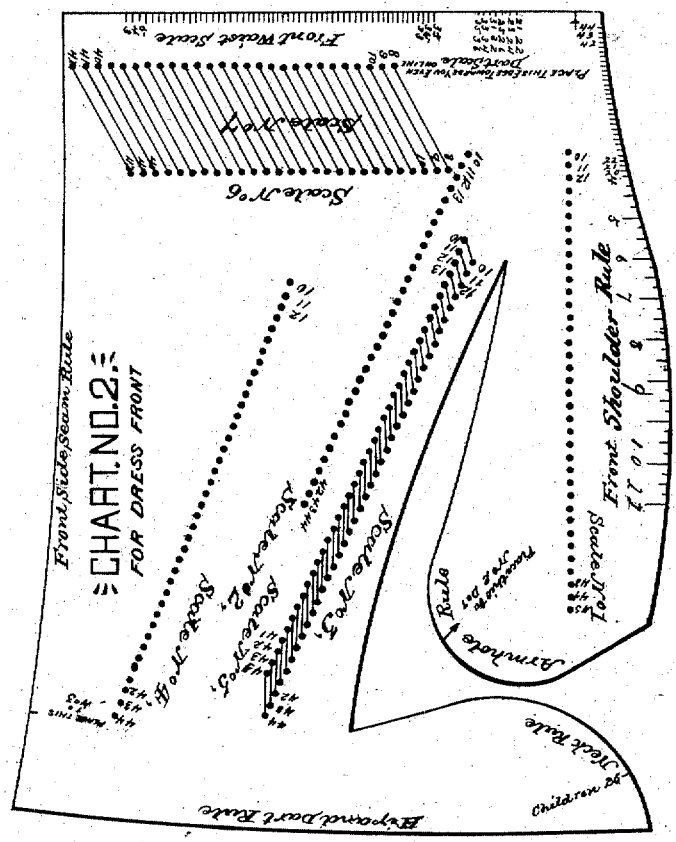
Figure 4:
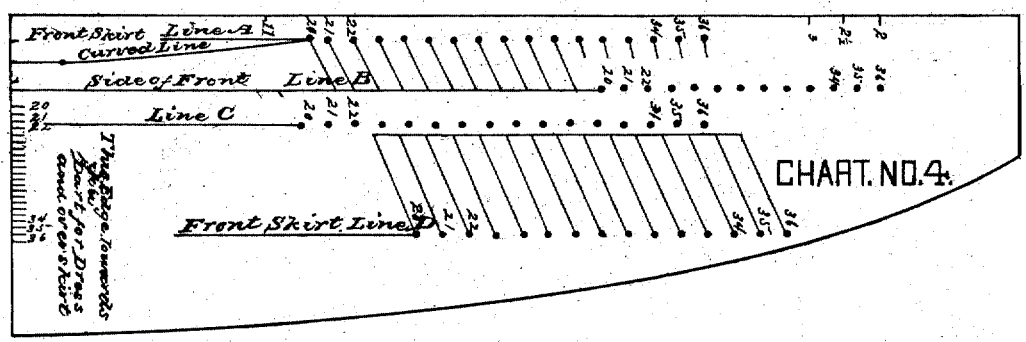

Figure 1 is a plan of the chart which designates the dress-back with sleeve attached. Fig. 2 is a plan of the chart which designates the dress front. Fig. 3 is a plan of the straight-edge chart; and Fig. 4 is a plan of the chart which designates the dress-skirt.

My invention has relation to charts for cutting out dress-patterns, which charts are provided with certain scales and other marks to regulate the size and proportion of the dresses to be cut from them; and it consists in an improved construction and marking of charts of that class, having for its object to facilitate their use, as hereinafter more fully set forth.

My improved system, as applied to dress-charts, consists of four separate charts, designated, respectively, as Figs. 1, 2, 3, and 4 on the annexed two sheets of drawings. I shall describe the arrangement and use of these charts in the order named, commencing with a description of chart No. 1, a plan of which is represented in Fig. 1.

The first part of this chart consists of a large square with rounded or oval corners, and is marked with three distinct rows of figures, designated, respectively, as scales No. 1, No. 2, and No. 3. Scales Nos. 1 and 3 give the size of armhole and width across the shoulder. From scale No. 2 the length of the waist under the arm is marked. To one side of the square portion of the chart is appended the so-called "back-waist scale," whose numbers mark the size of the back-waist and the waist-line.

The second part or section of chart No. 1 is designated a "back-shoulder rule," and is marked with the back-shoulder scale and instructions how to place the rule to draw shoulder-lines for different-sized persons. It is also provided with an inch-rule along the edge, from which to obtain length of shoulder. The rule for obtaining the shape of side seam is designated by the edge of the chart extending from the corner at back-shoulder scale to the mark indicated in scale No. 3. The part of the oval corner included between the letters *a* and *b*, I designate the "arm-rule," and it is used in obtaining the shape of the back part of the armhole.

The third part of chart No. 1 is designated as the "sleeve-rule," and is marked with the arm-size line, elbow-line, and wrist-line. The arm-size line has appended to it two scales of figures, designated, respectively, as A and B. The scale marked A is for the under half, and the scale marked B for the upper half, of the armhole of sleeve. The A and B scales, taken in connection with the arm-size slant, give exact size of armhole in sleeve. The elbow-line consists of two scales of figures, designated by the letters A' and B'. The scale marked A' is for the under half, and the scale marked B' for the upper half, of the elbow of sleeve. The A' and B' scales, taken in connection with the elbow-slant, give exact size of the sleeve at elbow. The waist-line consists, in like manner, of two scales of figures, designated, respectively, by the letters A'' and B''. The scale marked A'' is for the under half, and the scale marked B'' for the upper half, of the sleeve at wrist. The A'' and B'' scales, taken in connection with the wrist-slant, give exact size of the sleeve at wrist. After obtaining in this manner the exact size of the sleeve at the armhole, elbow, and wrist, the outline of the sleeve is marked with the side-seam ruler by placing the edges in contact with the dotted marks and tracing the line thus marked with a pencil.

Having described chart No. 1, I shall now proceed to describe in like manner the construction and arrangement of chart No. 2, a plan of which is represented in Fig. 2 of the drawings. This chart contains seven scales, designated, respectively, by the numbers 1, 2, 3, 4, 5, 6, and 7. It also has a front-waist scale with dart-scale, and a front-shoulder rule. Scales Nos. 1, 2, and 5 mark the size of armhole. No. 1 marks width between shoulders in front. No. 2 marks width of chest, and No. 5 marks width of bust. Nos. 3 and 4 mark size of waist in front. Scales Nos. 6 and 7 mark height of darts. The front-waist scale and small dart-scale combined give width of dart. The front side-seam rule and front-shoulder rule are the same as the corresponding rules in chart No. 1. The hip and dart rule is used in getting the shape of the upper part of the dart, and also size of the cross-dart over hip. The neck-rule is used for getting shape of neck. The armhole-rule is used for getting shape of armhole, which is obtained by placing the longer part of the rule to the dots formed from scales Nos. 1 and 2, and then placing the shorter part to the dots made from scales Nos. 2 and 5.

Chart No. 3 contains neck-scales for both back and front, also overskirt-rule. The object of this chart is to obtain all the straight lines used in cutting. The back-neck scale is used in getting the size of neck across the back. The front-neck scale, extending from Figs. 1 to 4, is used to get the height of the neck in front, and this scale is also used for getting the size of the neck in front. In the overskirt-rule scale No. 1 is used for obtaining the size of the overskirt in front, and scale No. 2 is used for locating dart. The size of dart is obtained from chart No. 4. This last chart in the series (shown in Fig. 4 and designated as "No. 4") contains dart-scale for dress and overskirt. The dress-skirt rule contains four scales of figures, designated, respectively, by the letters A, B, C, and D. The scale marked A is to obtain the size of front width of skirt, and the curve at top is given by the dot at front edge of scale. Scale D marks the slant of front width and also size at bottom. The scale marked B gets size of waist plus the darts. The waist of skirt is fitted by the dart-scale at the end of chart. The first dart is taken off of the front edge of second width of skirt, and the second dart is taken back of the dot made from the C-scale. The size of the dart is obtained by letting the front edge of the chart coincide with waist-line, and dotting size of dart from the number indicating the size of the waist. The width of the skirt is obtained by giving it a spring of three in eleven inches below waist-line, and then extending the line in the same proportion to the bottom of the skirt.

Having described the construction and arrangement of the four charts involved in my system, I shall now proceed to describe how to take the measure, in doing which the following rules should be borne in mind: First, a tight measure above the prominent part of the bust over the shoulder-blades; secondly, a tight measure over the prominent part of the bust; thirdly, the size of waist; fourthly, the length of back from the prominent bone of the neck to the bottom of the waist; fifthly, the length under the arm from where the arm joins the shoulder to the bottom of the waist; sixthly, the length of front from the highest point of shoulder to the bottom of waist; seventhly, the length of shoulder from neck to shoulder-joint; eighthly, the length of sleeve from shoulder to elbow, and then from shoulder to wrist; and, lastly, the measure of skirt from the waist-line to floor, in front, side, and back.

By the use of my improved charts and system a perfect fit may be obtained in the shoulders without the cut-and-try rule. This is done by getting the first length of waist from the arm-size. From this the waist-line is drawn, and from the waist-line the length of the back is obtained. This secures a perfect fit for the shoulders irrespective of shape. In other systems, and charts used with them, the dart is obtained by calculation, while by my system and charts it is already made out and marked on the proper chart. Another advantage is the superiority of my system and charts in obtaining a correct fit in the skirt, which is done by the aid of chart No. 4 in the manner described.

Having thus fully described my invention, I claim and desire to secure by Letters Patent of the United States—

The series of pattern-charts numbered, respectively, 1, 2, 3, and 4, constructed and arranged as described, for fitting, measuring, and cutting out dress-patterns, substantially as set forth.

In testimony that I claim the foregoing as my own I have hereto affixed my signature in presence of two witnesses.

ELLEN K. KINKER.

Witnesses:
ALBERT PYGALL,
CHARLES E. MILLER.

It is hereby certified that in Letters Patent No. 242,542, issued June 7, 1881, for an improvement in "Dress Charts," the name of the grantee, wherever it appears in said Letters Patent and in the printed specification forming a part thereof, was erroneously written and printed "Ellen K. Kinker," instead of "Ellen K. Rinker;" that the correct name is "Ellen K. Rinker," and that the proper corrections have been made in the papers and records pertaining to the case in the Patent Office, and are hereby made in said Letters Patent.

Signed, countersigned, and sealed this 11th day of October, A. D. 1881.

[SEAL.]

A. BELL,
*Acting Secretary of the Interior.*

Countersigned:

E. M. MARBLE,
*Commissioner of Patents.*